（12） United States Patent
Mitchell et al.

(10) Patent No.: US 11,287,086 B1
(45) Date of Patent: Mar. 29, 2022

(54) INTRA-DEWAR STRUCTURE (71) Applicant: Wavefront Research, Inc., Bethlehem, PA (US)

(72) Inventors: Thomas A. Mitchell, Bethlehem, PA (US); Jonas D. Corl, Bethlehem, PA (US)

(73) Assignee: Wavefront Research, Inc., Northhampton, PA (US)

( * ) Notice: Subject to any disclaimer, the term of this patent is extended or adjusted under 35 U.S.C. 154(b) by 18 days.

(21) Appl. No.: 15/958,190

(22) Filed: Apr. 20, 2018

Related U.S. Application Data (60) Provisional application No. 62/487,548, filed on Apr. 20, 2017.

(51) Int. Cl.
*F17C 3/08* (2006.01)
*G01J 3/18* (2006.01)

(52) U.S. Cl.
CPC ............. *F17C 3/085* (2013.01); *G01J 3/18* (2013.01); *F17C 2250/038* (2013.01); *F17C 2250/0478* (2013.01); *F17C 2250/0491* (2013.01); *F17C 2250/07* (2013.01)

(58) Field of Classification Search
CPC .................... F17C 3/085; F17C 2250/038
See application file for complete search history.

(56) References Cited

U.S. PATENT DOCUMENTS

| 4,325,530 | A | | 4/1982 | Niemann | |
|---|---|---|---|---|---|
| 5,235,184 | A | * | 8/1993 | Paulson | F25D 19/006 250/238 |
| 5,552,608 | A | * | 9/1996 | Gallagher | F17C 3/085 250/352 |
| 5,582,013 | A | * | 12/1996 | Neufeld | F16F 15/02 60/520 |
| 5,628,195 | A | * | 5/1997 | Hill | F17C 13/006 62/295 |
| 8,746,008 | B1 | * | 6/2014 | Mauritsen | F25B 1/10 62/510 |
| 2007/0084221 | A1 | * | 4/2007 | Ruocco-Angari | G01J 5/0205 62/51.1 |
| 2010/0050661 | A1 | * | 3/2010 | Snow | F25B 9/14 62/51.1 |
| 2016/0123630 | A1 | * | 5/2016 | Landry | F25B 9/14 62/6 |

* cited by examiner

*Primary Examiner* — Brian M King
(74) *Attorney, Agent, or Firm* — Culhane Meadows PLLC; Orlando Lopez (57) ABSTRACT

A system including an optical system having at least one refractive or reflective element, the optical system configured to substantially receive electromagnetic radiation emanating from a source, the optical system being located within a Dewar, a support structure, support structure being mechanically disposed between the optical system and a surface of the Dewar, the support structure having substantially low thermal conductance, a cold source; the cold source being located within the Dewar, a thermal link, the thermal link being mechanically disposed between the optical system and the cold source, the thermal link being substantially flexible and having substantially high thermal conductance.

5 Claims, 8 Drawing Sheets

INTRA-DEWAR STRUCTURE

This application claims priority to and benefit of U.S. Provisional Application No. 62/487,548, filed Apr. 20, 2017, entitled INTRA-DEWAR STRUCTURE, which is incorporated by reference herein in its entirety for all purposes.

STATEMENT REGARDING FEDERALLY SPONSORED RESEARCH OR DEVELOPMENT

This invention was made partially with U.S. Government support from the US Army subcontract PO22713 under prime W909MY-12-D-0008/0012, and US Army Contract W909MY-17-C-0018. The U.S. Government has certain rights in the invention.

BACKGROUND

Figure 1A:
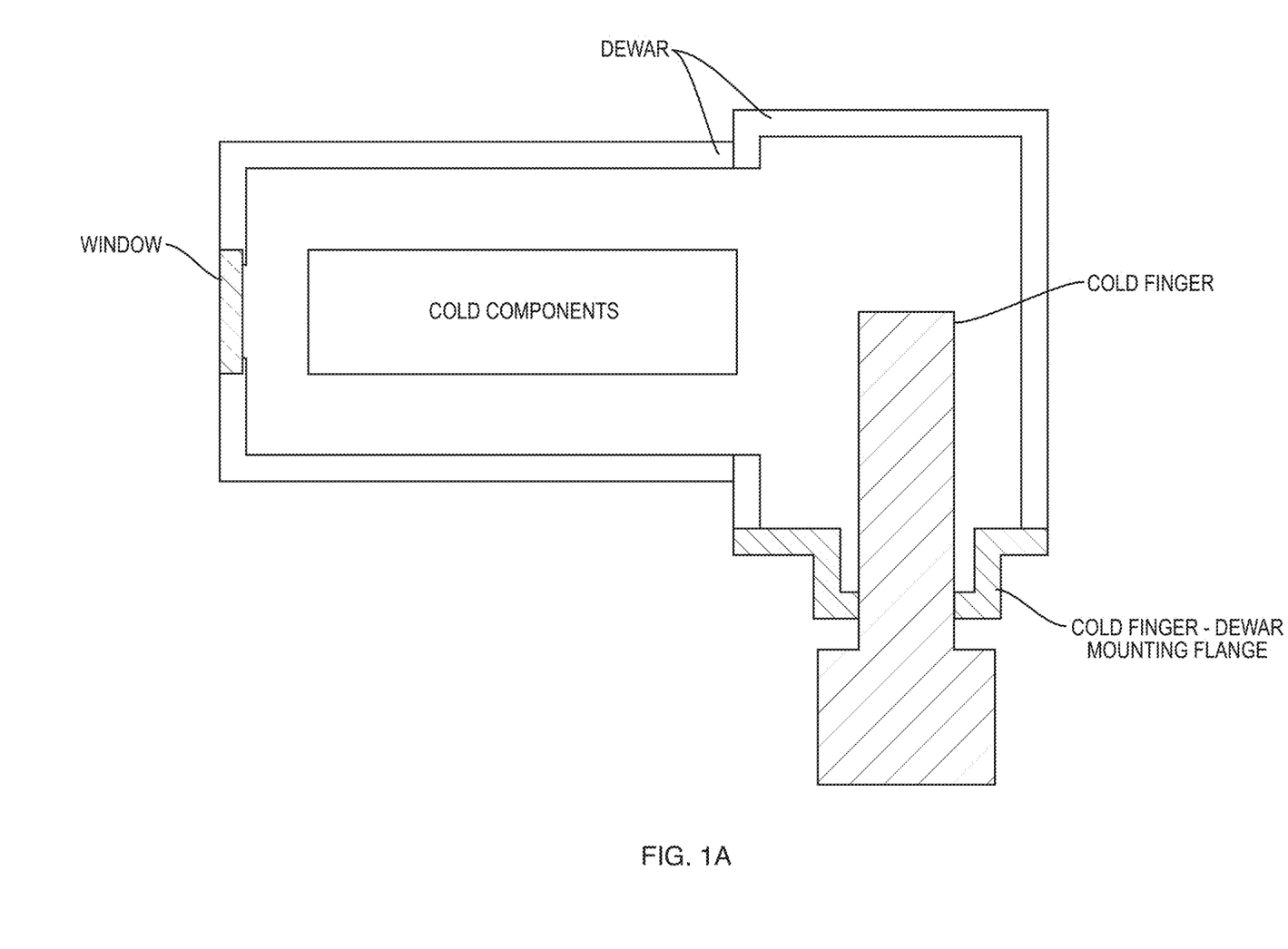
FIG. 1A shows a typical Dewar layout.

In the course of designing and building some cryogenic Dewars, there is a need to accurately align, orient, and affix cold components while minimizing the transfer of thermal energy from the warm components to the cold components and while enabling the cryogenic cooler to effectively cool the any components intended to be cooled. FIG. 1A shows this general layout in cross section.

The Dewar may comprise any number of cold components or groups of components to be positioned, aligned, oriented, and affixed and there may be one or multiple cold fingers in any orientation. Typically, the cold components are mounted directly to the cold finger to rigidly locate them and to provide good thermal contact for cooling.

Figure 2:
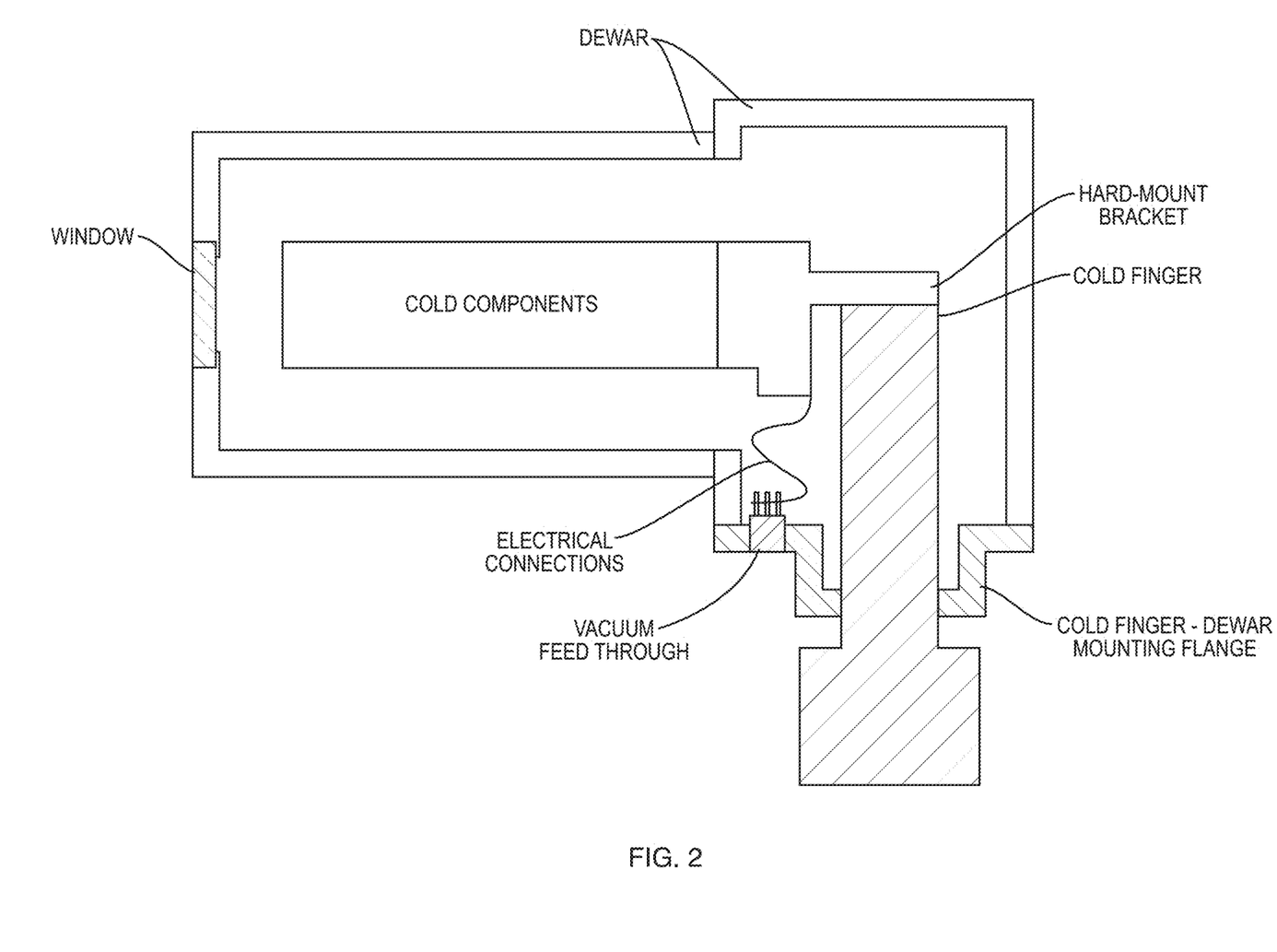
FIG. 2 shows a typical hard mount to cold finger layout.

The general problems with this approach include the following: (1) accurate placement of the components requires compensation in the design or in an adjustable compensator for the contraction of the cold finger; (2) the cold finger and its Dewar mounting flange, as well as any other intermediate components between the reference datum and the cold components, must be tightly toleranced to precisely position the cold components mounted on the cold finger, increasing complexity of construction; (3) vibrations from the cold finger are directly transferred to the cold components that must be precisely affixed, positioned, and oriented; (4) in some cases, the cold components are mechanically over-constrained between a contracting cold finger and any additional supports, if needed; and (5) the cost of the Dewar is increased with the increased complexity and tolerances. FIG. 2 shows an embodiment of the typical approach of hard mounting to the cold finger.

In particular, yet another problem with the hard mount approach in an optical system is disassembling any of the components during the construction and alignment process. The internal alignment of the components to each other can be compromised by a disassembly that has been forced because one or more of the components in the tolerance stackup is inseparably attached to the cold finger.

There is a need for systems that mitigate the above described problem with the hard mount approach.

SUMMARY

Systems that mitigate the above described problem with the hard mount approach are described herein below.

In one or more embodiments, the system of these teachings includes an optical system having at least one refractive or reflective element, the optical system configured to substantially receive electromagnetic radiation emanating from a source, the optical system being located within a Dewar, a support structure, support structure being mechanically disposed between the optical system and a surface of the Dewar, the support structure having substantially low thermal conductance, a cold source; the cold source being located within the Dewar, a thermal link, the thermal link being mechanically disposed between the optical system and the cold source, the thermal link being substantially flexible and having substantially high thermal conductance.

A number of other embodiments are also disclosed.

DETAILED DESCRIPTION

The following detailed description presents the currently contemplated modes of carrying out these teachings. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Figure 1B:
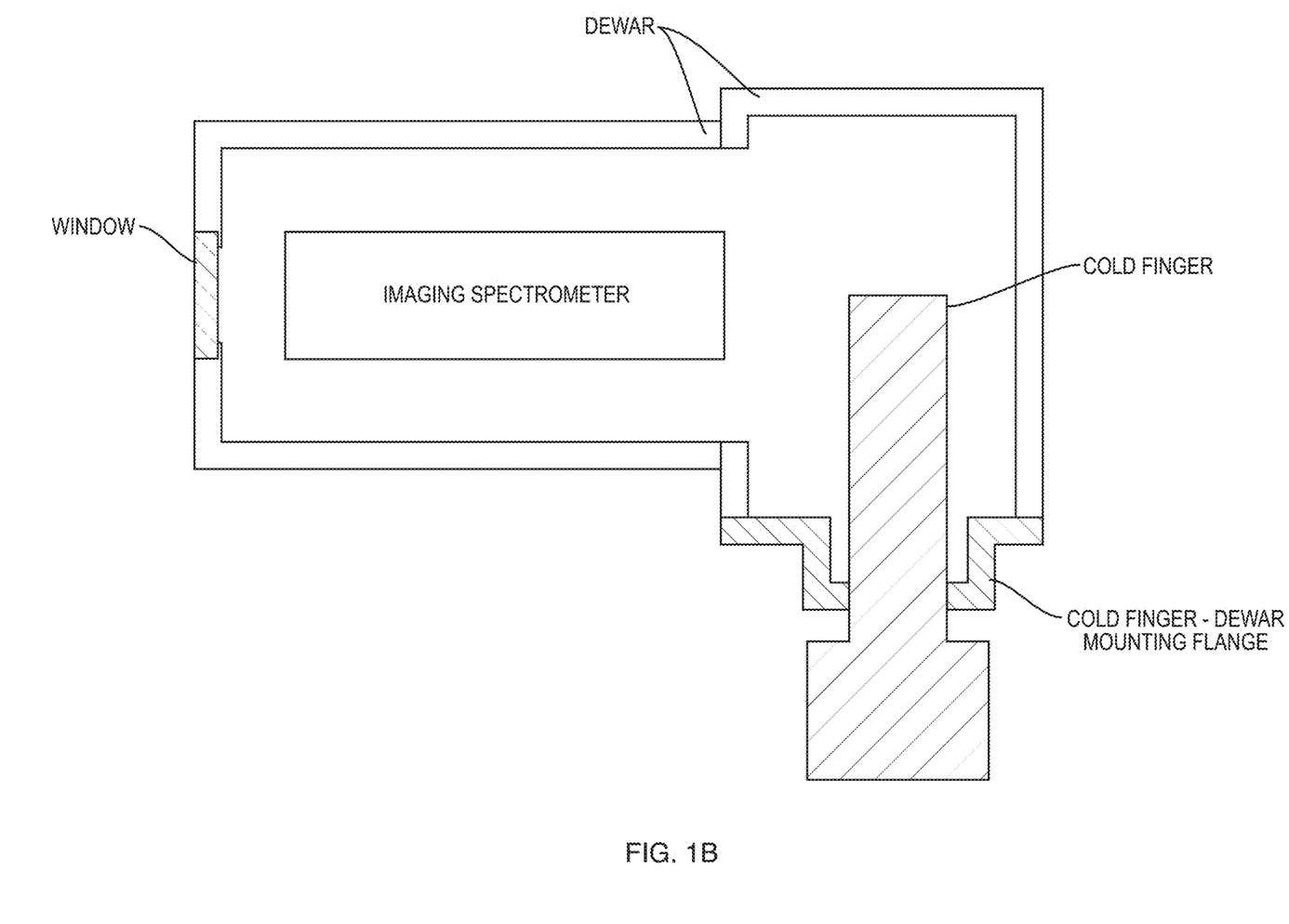
FIGS. 1B and 1C show an embodiments of a Dewar layout of these teachings.
Figure 1C:
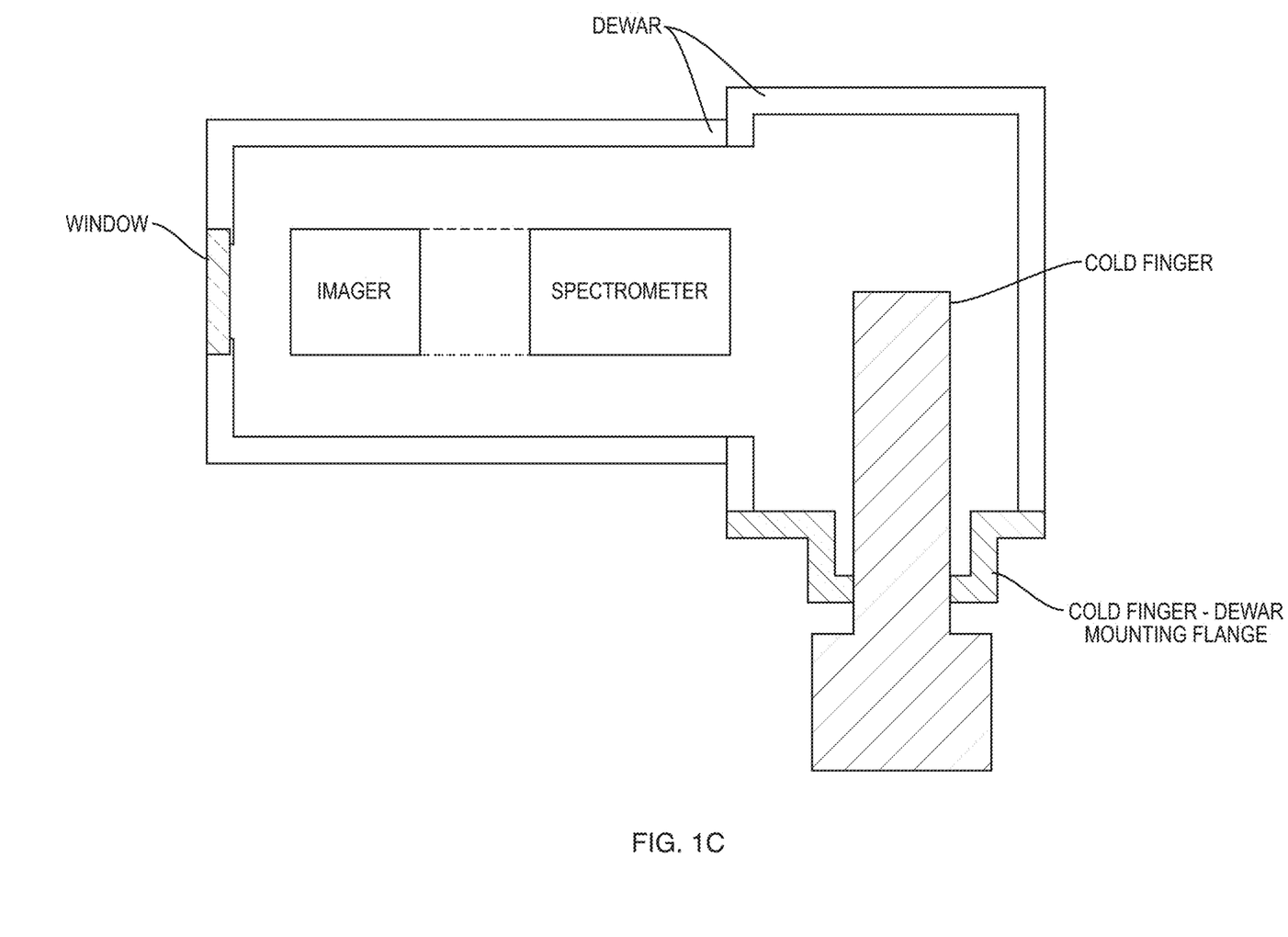

The problems with the hard mount approach can be mitigated by the novel intra-Dewar construction of the present teachings. The cold components that must be held securely and accurately in place can be held by a low thermal conductance structure while the cold finger can be connected to the cold components by a flexible link. The cold components may include, but are not limited to, detectors, optical systems, electronics, imagers, spectrometers, and imaging spectrometers. Typical example of imagers (imaging optical subsystems) and spectrometers can be found in U.S. Pat. Nos. 7,061,611, 9,568,737, the US patent publications to corresponding U.S. patent application Ser. No. 14/657,355, U.S. Pat. No. 9,891,107, and the references cited therein, all of which are incorporated by reference herein in their entirety and for all purposes. The embodiments in FIGS. 1B and 1C depict the cold components comprising an imaging spectrometer and imager and spectrometer, respectively.

Figure 3:
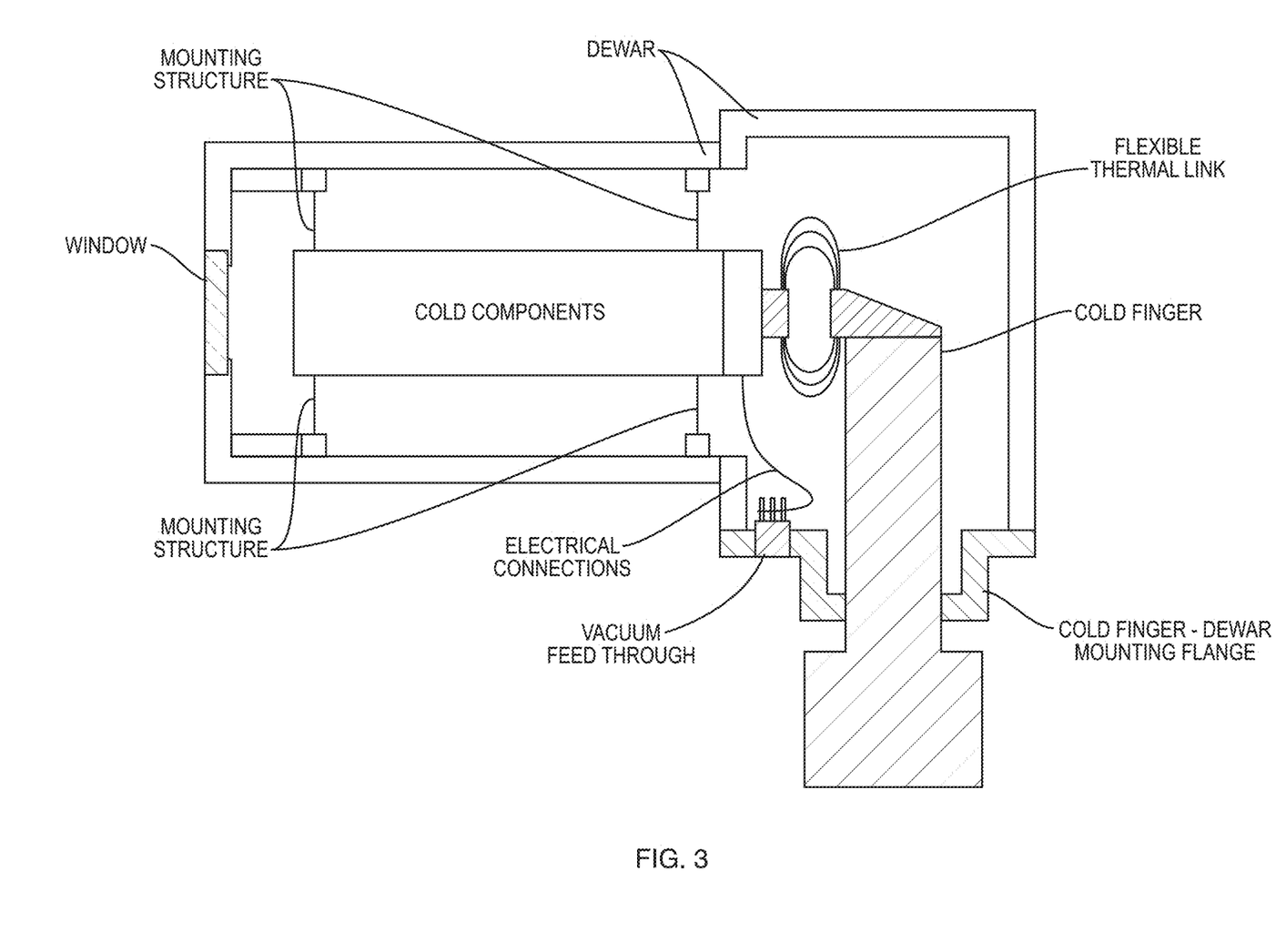
FIG. 3 shows another embodiment of the Dewar layout of these teachings.

FIG. 3 depicts an embodiment of the present teachings where the cold components are supported, affixed, positioned, and oriented by a separate mounting structure that bridges the vacuum gap between the Dewar (warm components) and the cold components while the cold finger is used for cooling via a flexible thermal link comprised of an assembly of conducting ribbons formed in a loops between two mounting blocks. Related use of cold fingers is described in US patent publications related to U.S. patent application Ser. No. 14/604,139, COMPACT DUAL DETECTOR DEWAR, which is incorporated by reference herein in its entirety and for all purposes.

An imager, also referred to as an imaging optical subsystem, as used here in, refers to an optical subsystem configured to transmit and direct light.

Light, as used herein, refers to electromagnetic radiation.

The thermal link can introduce some additional temperature delta (thermal resistance) between the cold finger and the cold components. In high load or low-temperature conditions the thermal resistance of the thermal link can be significant. The thermal resistance can be minimized, for example, by choosing high-thermal-conductivity materials, such as, but not limited to, copper, silver, gold, aluminum, other metals, pyrolytic graphite, diamond, and superconducting materials. Additionally, the mounting structure can introduce additional thermal load versus having no mounting structure. The additional load can be minimized by methods such as, but not limited to, increasing the path length from the warm components to the cold ones, reducing the cross-sectional area in the path of thermal flow, and by choice of low thermal conductivity materials such as, but not limited to, ceramics, glasses, steel, titanium, plastics, composites, and organics.

It is not only desirable that the thermal link in the subject teachings minimize the thermal resistance, as described above, but also it is desirable in many embodiments of the present teachings that the thermal link provide mechanical compliance between the cold finger and the cold components. Some embodiments include, but are not limited to: a metal braided link; foil ribbons, bands, shapes, or a stack thereof forming a loop or S-curve; any combination of mechanical joints such as, but not limited to, U-joints, spherical joints (ball and socket), rotary joints, sliding (translating) joints; flexures; a conductive wool; metal bellows; fluidic links with seals or flexible enclosures; a bed of beads, grains, or balls that conformally connect the coldfinger and cold components; flexible heat pipes; and a high conductivity elastomeric connection.

The subject teachings allow for: (1) accurate placement without the need to accommodate for the cold finger contraction (it is of no consequence due to the flexible link), (2) more loosely tolerance cold finger and cold finger—Dewar flange components because those components no longer need to define the cold components' position, (3) lower vibrations in the cold components, (4) no over-constraint due to contraction of the cold finger, and (5) lower cost and higher assembly robustness by reducing the complexity and tolerances of high-value-added components such as the cold finger and flange that contains feedthroughs.

In some optical systems, the cold components must be aligned with respect to optics outside of the Dewar. By using a support structure and a flexible mount to the cold finger, the components can be aligned, oriented, and positioned to the outside components by a minimum tolerance stackup. Only the support structure and the component of the Dewar it mounted to are included in that stackup, rather than including in the stackup a mounting bracket to the cold finger, the cold finger, the cold-finger Dewar flange, and any other components that are required to align the cold components to the datum on the other side of the window.

Figure 4A:
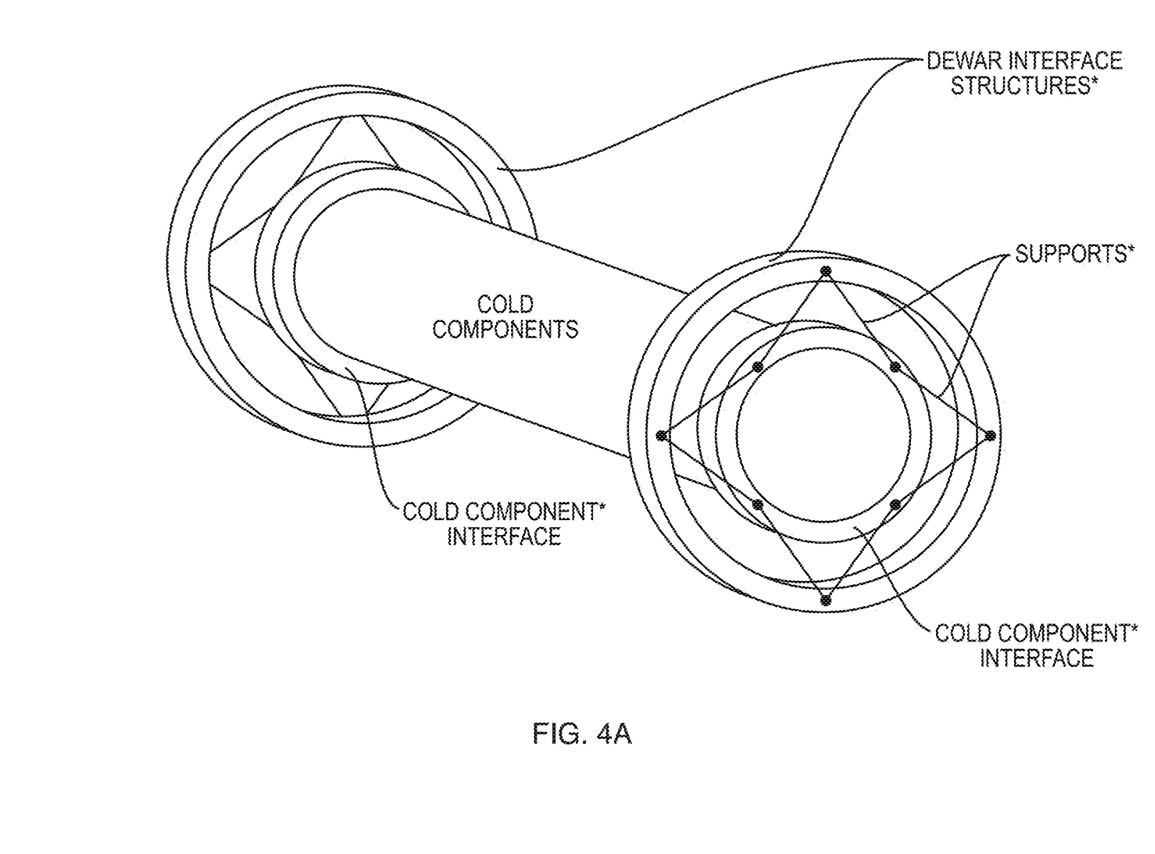
FIGS. 4A and 4B show yet another embodiment of the Dewar layout of these teachings.
Figure 4B:
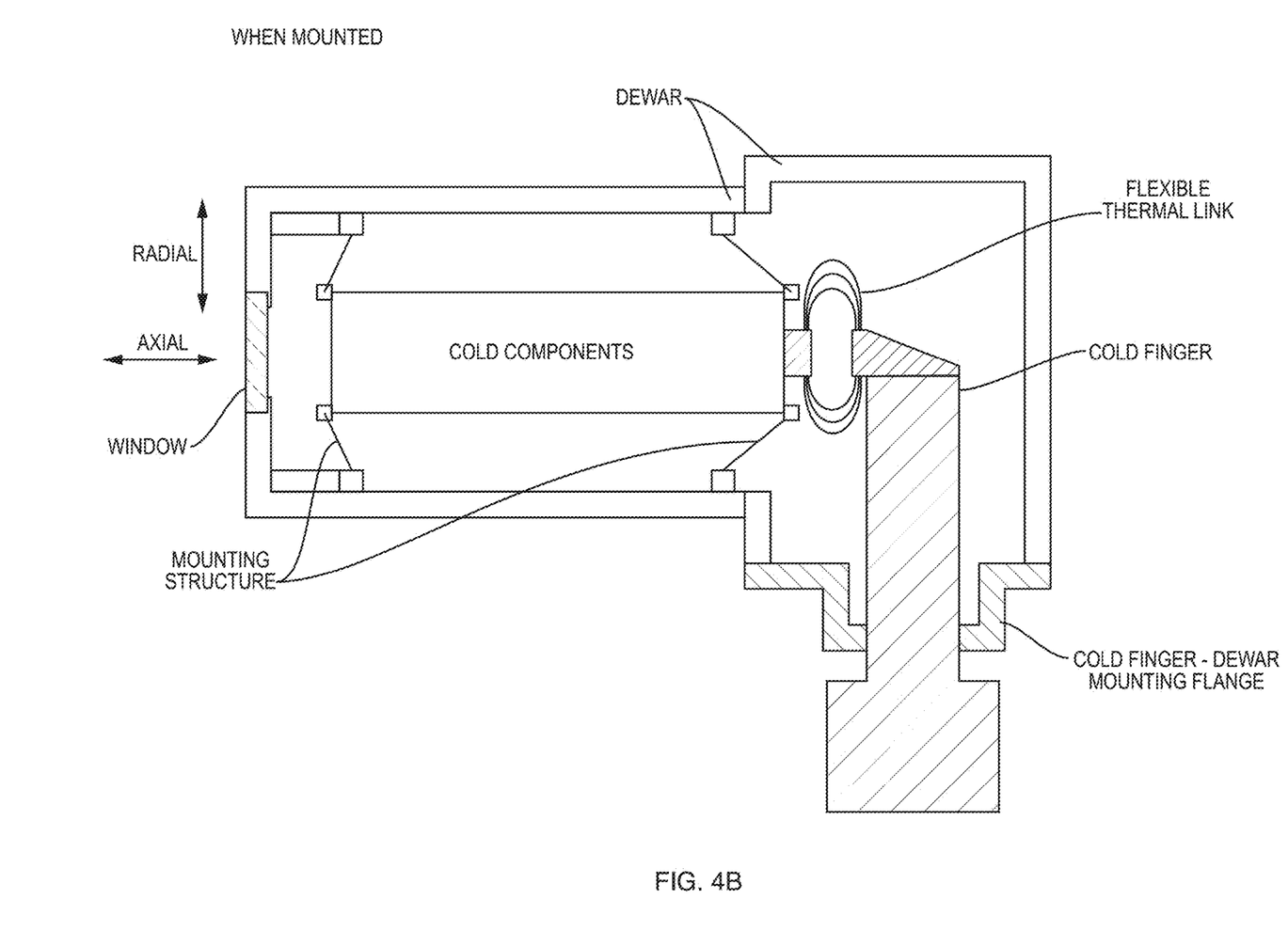

FIGS. 4A and 4B show the mounting structure in one embodiment of the present teachings comprising multiple "spiders" that bridge the gap between the cold components and the Dewar. The components comprising the spiders are marked with an *. The supports of these spiders can be solid material or sheet material in patterns, shapes, or membranes, or they can be tensioned wires, filaments, or spokes, much like a bicycle wheel. The "radial" position in the figure can be maintained by tension in the supports between the Dewar interface structures and the cold components interfaces. Axial position can be maintained by preloading the spiders axially in the Dewar and thus producing a tension component in the axial direction. Radial and axial position can also be maintained by structural rigidity of the members in concert with or without any induced tension or compression in the members.

Figure 5:
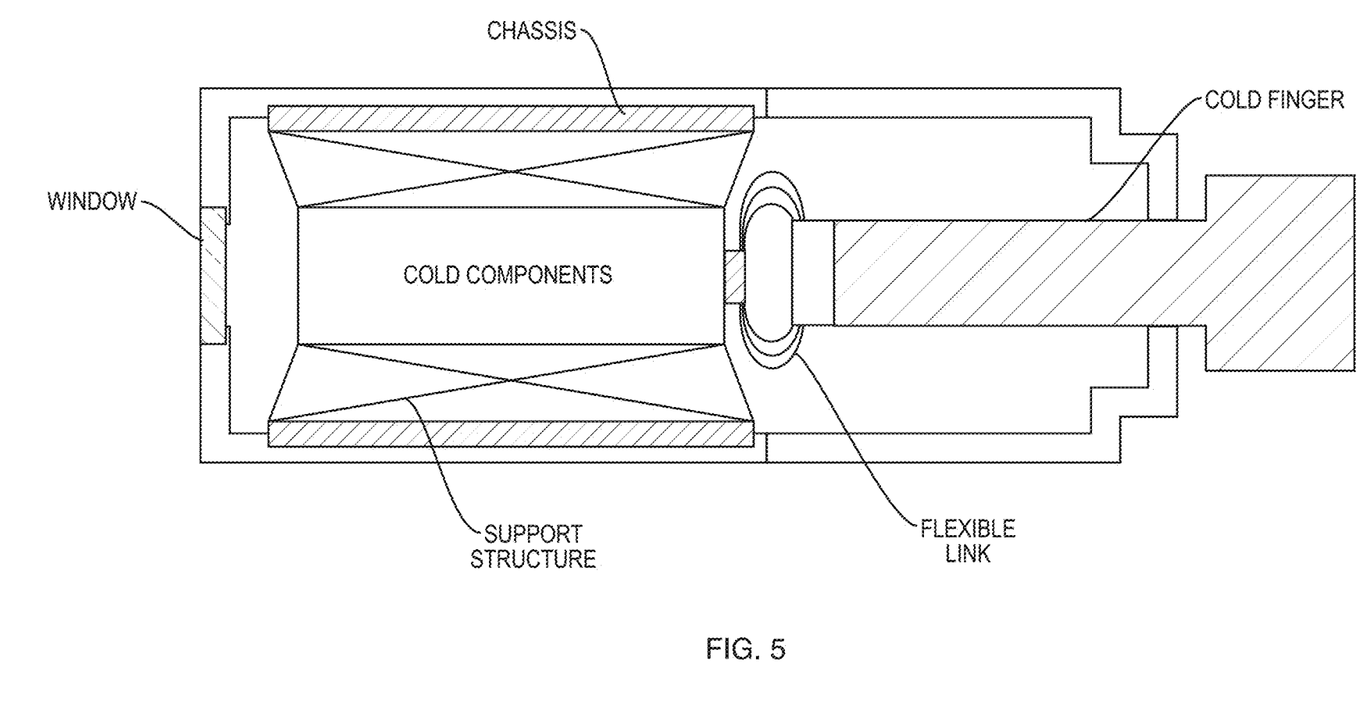
FIG. 5 shows still another embodiment of the Dewar layout of these teachings.

FIG. 5 shows yet another embodiment of the present teachings comprising a support structure wherein there is an external warm "chassis" to which the cold components are mounted by means of a support structure. The support structure can be spiders, wires, spokes, or other shapes. In the embodiment in FIG. 5, for example, wires or spokes are shown tensioned between the cold components and the chassis to provide support of the cold components while minimizing thermal losses. The chassis can be hard mounted to and optionally removable from the Dewar.

The embodiments of the present teachings in FIGS. 4A, 4B and FIG. 3 also employ balancing of forces generated by members of the support structure. These forces can be generated by, without limitation, thermal contraction or expansion, preload, interferences, acceleration, magnetism, gravity, etc. The structure is shown to be symmetric but can also be asymmetric-in either case the loads are often balanced about a reference datum. Reference datums can be, but are not limited to, axes, planes, surfaces, fiducials, and points. While the internal components cool, there is a contraction or change in length of the internal components. Embodiments of the present invention such as those depicted in FIG. 3, FIGS. 4A, 4B, and FIG. 5 use symmetry to maintain the position of the cooled components by balancing loads within the structure. The thermal contraction loads balance and the cold component reference datums do not substantially move with respect to reference datums on the warm Dewar walls.

When all warm-space structures are substantially symmetric, as depicted by the substantially rotationally-symmetric Dewar Interface Structures (*) in FIGS. 4A and 4B, even changes in the ambient temperature do not substantially affect the radial position of the components. This is useful for maintaining alignment of the cold components to those external to the Dewar over fluctuating ambient conditions.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

The invention claimed is:

1. A cryogenic optical device comprising:
   a Dewar vessel;
   a cold finger;
   a thermal link;
   said thermal link configured to be flexible;
   a support structure;
   said support structure disposed between cold and warm components; said warm components comprising an inner surface of said Dewar vessel;
   said support structure comprising one or more spiders;
   said one or more spiders being mechanically disposed between said cold and said warm components;

said cold components comprising an optical system;
said cold finger not being supported by said support structure;
said optical system comprising at least one of an imager or an imaging spectrometer;
said one or more spiders having a geometric shape;
said one or more spiders configured to minimize thermal conductivity between said cold components and said warm components;
said one or more spiders further configured to rigidly support for said cold components with respect to said warm components;
said cold components also configured to not be supported by said cold finger;
said cold finger flexibly and operatively thermally connected to said cold components by said thermal link;
said cold components, cold finger, and support structure disposed inside the Dewar vessel.

2. The cryogenic optical device of claim 1, wherein said one or more spiders further comprise wires or filaments or spokes or sheet material in tension; said geometric shape of said one or more spiders is maintained by said tension.

3. A cryogenic optical device comprising:
a Dewar vessel;
a cold finger;
a thermal link;
a chassis;
said thermal link configured to be flexible;
a support structure;
said support structure disposed between cold and warm components; said warm components comprising said chassis;
said support structure operatively connected to said chassis;
said cold finger not being supported by said support structure;
said support structure comprising one or more spiders;
said one or more spiders being mechanically disposed between said warm components and said cold components;
said cold components comprising an optical system;
said optical system comprising at least one of an imager or an imaging spectrometer;
said one or more spiders having a geometric shape;
said one or more spiders configured to minimize thermal conductivity between said cold components and said warm components;
said one or more spiders further configured to rigidly support said cold components with respect to said chassis;
said cold components also configured to not be supported by said cold finger;
said cold finger flexibly and operatively thermally connected to said cold components by said thermal link;
said chassis, said cold components, said cold finger, and said support structure disposed inside said Dewar vessel;
said chassis being configured to be removable from said Dewar vessel.

4. The cryogenic optical device of claim 3 wherein said one or more spiders further comprise wires or filaments or spokes or sheet material in tension; said geometric shape of said one or more spiders being maintained by said tension.

5. The cryogenic optical device of claim 3 wherein said chassis is a warm component.

* * * * *